(12) United States Patent
Mecklinger et al.

(10) Patent No.: US 9,823,662 B2
(45) Date of Patent: Nov. 21, 2017

(54) TRANSPORT VEHICLE FOR THE TRANSPORT OF LOAD SHELVES WITH PARTIALLY AUTONOMOUS OPERATION AND METHOD FOR OPERATING SAID TRANSPORT VEHICLE

(71) Applicant: Grenzebach Maschinenbau GmbH, Asbach-Baeumenheim (DE)

(72) Inventors: Siegfried Mecklinger, Buchdorf (DE); Bernhard Kuegle, Mering (DE)

(73) Assignee: GRENZEBACH MASCHINENBAU GMBH, Asbach-Baeumenheim (DE)

( * ) Notice: Subject to any disclaimer, the term of this patent is extended or adjusted under 35 U.S.C. 154(b) by 0 days.

(21) Appl. No.: 15/022,782

(22) PCT Filed: Aug. 19, 2014

(86) PCT No.: PCT/DE2014/000418
§ 371 (c)(1),
(2) Date: Mar. 17, 2016

(87) PCT Pub. No.: WO2015/043561
PCT Pub. Date: Apr. 2, 2015

(65) Prior Publication Data
US 2016/0231751 A1    Aug. 11, 2016

(30) Foreign Application Priority Data

Sep. 26, 2013  (DE) ..................... 10 2013 016 118

(51) Int. Cl.
*G05D 1/02* (2006.01)
*B66F 9/06* (2006.01)
(Continued)

(52) U.S. Cl.
CPC .............. *G05D 1/0297* (2013.01); *B60P 1/02* (2013.01); *B60P 1/6409* (2013.01); *B66F 9/063* (2013.01);
(Continued)

(58) Field of Classification Search
CPC .................................................... G05D 1/0297
See application file for complete search history.

(56) References Cited

U.S. PATENT DOCUMENTS 4,496,274 A    1/1985  Pipes
5,280,431 A    1/1994  Summerville et al.
(Continued)

FOREIGN PATENT DOCUMENTS

DE    102004047514    3/2006

OTHER PUBLICATIONS

Gawrilow, E., et al., "Dynamic Routing of Automated Guided Vehicles in Real-Time." Technische Universitaet Berlin, Institut Fuer Mathematik, Oct. 10, 2007, No. 039/2007, pp. 1-12.
(Continued)

*Primary Examiner* — Adam Tissot
*Assistant Examiner* — Michael Berns
(74) *Attorney, Agent, or Firm* — Duane Morris LLP; Gregory M. Lefkowitz; Jason M. Nolan (57) ABSTRACT

The invention concerns a transport vehicle and a method for the trouble-free transport of load shelves in workshops with partially autonomous operation, having the following features: (a) a vehicle body with a carrier plate for receiving and transporting a load shelf with cargo, with two separately driven drive wheels, at least one support wheel being provided at the front and at the rear of the vehicle body in each case; (b) a transverse link which connects the drive wheels which are each pivotable via an angled lever about the rotational axis, such that the drive wheels can carry out vertical movements independently of each other; (c) a centrally disposed adjusting element which, via a lifting-turning lever and a thrust rod connected thereto, can move two front lifting rods and two rear lifting rods in order to raise or lower the carrier plate; (d) a system for supplying energy to the vehicle body; and (e) at least one 3D scanner and at least one light field sensor in the front region of the vehicle body.

10 Claims, 7 Drawing Sheets

(51) Int. Cl.
  *B66F 9/075* (2006.01)
  *B60P 1/02* (2006.01)
  *B60P 1/64* (2006.01)

(52) U.S. Cl.
  CPC ........ *B66F 9/0755* (2013.01); *B66F 9/07586* (2013.01); *G05D 1/024* (2013.01); *G05D 2201/0216* (2013.01)

(56) References Cited

U.S. PATENT DOCUMENTS

| | | | | |
|---|---|---|---|---|
| 5,610,815 | A | * | 3/1997 | Gudat ................... G01S 19/11 318/587 |
| 2007/0288123 | A1 | | 12/2007 | D'Andrea |
| 2008/0077511 | A1 | * | 3/2008 | Zimmerman .......... G06Q 10/00 705/28 |
| 2011/0128412 | A1 | | 6/2011 | Milnes et al. |
| 2016/0167557 | A1 | * | 6/2016 | Mecklinger ............. B66F 9/063 414/495 |
| 2016/0231751 | A1 | * | 8/2016 | Mecklinger ............. B66F 9/063 |

OTHER PUBLICATIONS

Bouguerra, A., et al., "An Autonomous Robotic System for Load Transportation," Emerging Technologies & Factory Automation, IEEE Conference, 2009.

Lecking, D., et al., "Variable Pallet Pick-Up for Automatic Guided Vehicles in Industrial Environments," Emerging Technologies & Factory Automation, IEEE Conference, 2006, pp. 1169-1174.

Ullrich, G., "Fahrerlose Transportsysteme" Wiesbaden: Vieweg + Teubner Verlag, 1 Auflage 2011—ISBN 978-38348-0791-5, with English translation of relevant portion of this reference, as cited in the German Office Action, dated Aug. 24, 2014, of the priority application which is German Patent Application No. 10 2013 016 381.1.

* cited by examiner

Fig. 7

TRANSPORT VEHICLE FOR THE TRANSPORT OF LOAD SHELVES WITH PARTIALLY AUTONOMOUS OPERATION AND METHOD FOR OPERATING SAID TRANSPORT VEHICLE

CROSS-REFERENCE TO RELATED APPLICATIONS

This application is a §371 national stage entry of International Application No. PCT/DE2014/000418, filed Aug. 19, 2014, which claims priority to German Patent Application No. 10 2013 016 118.5, filed Sep. 26, 2013, the entire contents of which are incorporated herein by reference.

The present invention relates to a transport vehicle and to a method for transporting storage shelves by partially autonomous operation and without interference in factory buildings.

In a multiplicity of corporate sectors, for example in foodstuffs and domestic goods or industrial and domestic products trading, goods are present in homogenous original pallets having identical containers in storage shelves. A container here may be a packed or non-packed unit load, or an assembly of goods such as a box, a carton, or a crate having bulk material or a plurality of individually packed goods such as beverage bottles or dairy produce.

In order for a shipment to a specific customer to be assembled, packs having variable items or containers have to be assembled.

Collecting individual component parts of such a shipment in this case may be performed by hand or by means of automatically guided vehicles. Such so-called AGVs (automatically guided vehicles) may be mobile robots or vehicles specially constructed for the respective application, which by a special guiding and controlling method are moved from one place to another.

Traditional automatically guided vehicles by way of which materials are moved in factories and warehouses, for example, have minimum point-to-point movement control. Most such systems use AGVs which follow a fixed guide track. This here is generally a high-frequency transmission antenna wire which is disposed so as to be sunk into the factory floor, a reflective strip which is painted onto the floor, or a reflective tape which is adhesively bonded onto the floor. However, such guide tracks are obviously very prone to damage and unreliable.

All these movement controls limit the freedom of movement of the individual AGVs in that the latter are forced to follow a physically established path.

Most such systems depend on vehicle-specific proximity detection in order to avoid collisions with other vehicles, static objects, or human personnel. In such systems, the AGVs can only move longitudinally in one direction along the lane the former are pursuing.

Such systems achieve point-to-point movement by implementing control schematics and using freely movable AGVs having programmable bi-directional paths. On account thereof, it is achieved that a plurality of AGVs are located on the same paths simultaneously without any collisions or excessive jams.

These methods maximize the degree of freedom of movement of the AGVs. The control schematics here implement a schematic of "static" collision avoidance for AGV systems. Here, a computer program for examining the respective environment of an AGV is substantially used in order to determine only such paths that are usable by AGVs. A further allocation program extracts therefrom the required data in order for AGVs to be moved from one point to another in the respective system, without two AGVs simultaneously using the same path.

The disadvantages of these methods of the prior art lie in that the latter are limited to either closed routes, to unidirectional movement, to the absence of external control of the AGV movement, or to "static" collision avoidance.

In order for these disadvantages to be avoided, DE 689 28 565 T2, according to the details of patent claim 1, discloses a method for directing a plurality of automatically guided vehicles (AGV) along a network of interconnected paths which commence at intersections, end at intersections, and contain intersections.

In this method, a record of a route to be followed by the specific AGVs in the form of path sections which commence at an intersection and end at the next intersection is established.

Furthermore, an indication of the position of a specific AGV is established. Furthermore an indication of whether the intersection is free or occupied is derived for each intersection.

Furthermore, a list of intersections which contains the intersection just visited by the specific AGV by at least a few intersections along the recorded route, which will be visited by the specific AGV, is generated for a specific AGV. This is performed including checking that each of the intersections in the list is free prior to being accepted in the list, and marking each intersection in the list as being occupied once said intersection has been accepted in the list. Furthermore, transmitting the list of intersections to the specific AGVs and instigating that said AGV moves longitudinally forward on the recorded route through the intersections is performed.

It is the object of the present invention to provide an autonomous transport vehicle by way of which rapid transporting of storage shelves may be executed in large factory buildings without interference even in the case of a non-planar floor and in the case of slight inclinations.

This object is achieved by:

A transport vehicle for transporting storage shelves by partially autonomous operation and without interference in factory buildings, the transport vehicle having the following features:

a) a vehicle body (9) having a support plate (4) for receiving and transporting a storage shelf (1) having transported goods (2), having two separately driven drive wheels (5) on both sides of one in each case individually mounted rotation axle (32) in the center of the vehicle body (9), wherein in each case at least one support wheel (8) is provided on the front side and on the rear side of the vehicle body (9), b) a transverse link (13) which connects the drive wheels (5) which are in each case by way of an angular lever (31) pivotable about the rotation axle (32) such that said drive wheels (5) may execute mutually independent vertical movements, c) a centrally disposed control member (17) which by way of a lift-and-rotate lever (38) and by way of a push rod (35) connected to the latter may move two front lifting rods (40) and two rear lifting rods (26) for lifting or lowering the support plate (4), d) a system for supplying energy to the vehicle body (9) either by way of inductive lines installed in the floor, or by way of energy supply stations which are for feeding electrical, liquid, or gaseous energy and are accessible when stationary, wherein installation space (16) for corresponding energy storage units is provided in the vehicle body (9), e) at least one 3-D scanner (3) and at least one light-field sensor (6) in the front region of the vehicle body (9).

The device can be further characterized in that at least one laser scanner (3) and at least one light-field sensor (6) are provided on each side of the transport vehicle.

The device can be further characterized in that for separate height adjustment the front lifting rods (40) in each case have one control member, and the rear lifting rods (26) in each case have one control member.

The device can be further characterized in that the center of gravity of the storage shelf (12) is detected by means of sensors, and in that the result of such center-of-gravity determination is used for controlling the control members of the lifting rods (40) and (26).

The device can be further characterized in that sensors for detecting the rotation movement of the drive wheels (5) are provided, which sensors may also determine slippage on each drive wheel (5) dependent on the speed of the transport vehicle.

This object is also achieved by:

A method for operating a transport vehicle for transporting storage shelves by partially autonomous operation and without interference in factory buildings, the method having the following features:

a) a command center in a warehouse region receives the order to ensure that a specific storage shelf (1) having transported goods (2) located thereon is to be transported to a specific destination;

b) the command center determines which transport vehicle (9), based on the current location thereof and the present order status thereof, is in the position to handle the pending order in the fastest manner;

c) a specific transport vehicle (9) then receives from the command center the order to seek a specific storage shelf (1) in a specific area of a comparatively large floor space of a warehouse region, to pick up this storage shelf (1), and to drive with this storage shelf (1) having the transported goods (2) located thereon to a specific storage space;

d) the transport vehicle (9) selected by the command center receives from the command center the instructions, which have been determined by means of a specific route algorithm, in terms of the route to be driven and of the speed to be driven in each section of the journey in order for the immediate destination region to be reached in a specific time window;

e) the transport vehicle (9) by means of the 3-D scanner (3) and of the light-field sensor (6) determines the storage shelf (1) to be picked up, selects a suitable initial position for picking up the storage shelf (1), drives under the latter and lifts up the latter for transport;

f) the transport vehicle (9) awaits the instructions from the command center and, according to the received instructions, starts off on the return journey.

The method can be further characterized in that the center of gravity of the storage shelf (1) is detected by means of sensors, and the result of such center-of-gravity determination is used for controlling the control members of the lifting rods (40) and (26), and in that the inclination of a storage shelf (1) is determined by means of an inclination sensor.

The method can be further characterized in that sensors for detecting the rotation movement of the drive wheels (5) are provided, which sensors may also determine slippage on each drive wheel (5) dependent on the speed of the transport vehicle.

The method can be further characterized in that each storage shelf (1) on all sides of the shelf unit posts (7) thereof has a marking in the form of a bar code or of a data-matrix code.

This object is also achieved by:

A computer program having a program code for carrying out the method steps when the program is executed in a computer.

This object is also achieved by:

A machine-readable carrier having the program code of a computer program for carrying out the method when the program is executed in a computer.

respectively.

The device according to the invention will be described hereunder in more detail. In the figures, in detail.

Figure 1:
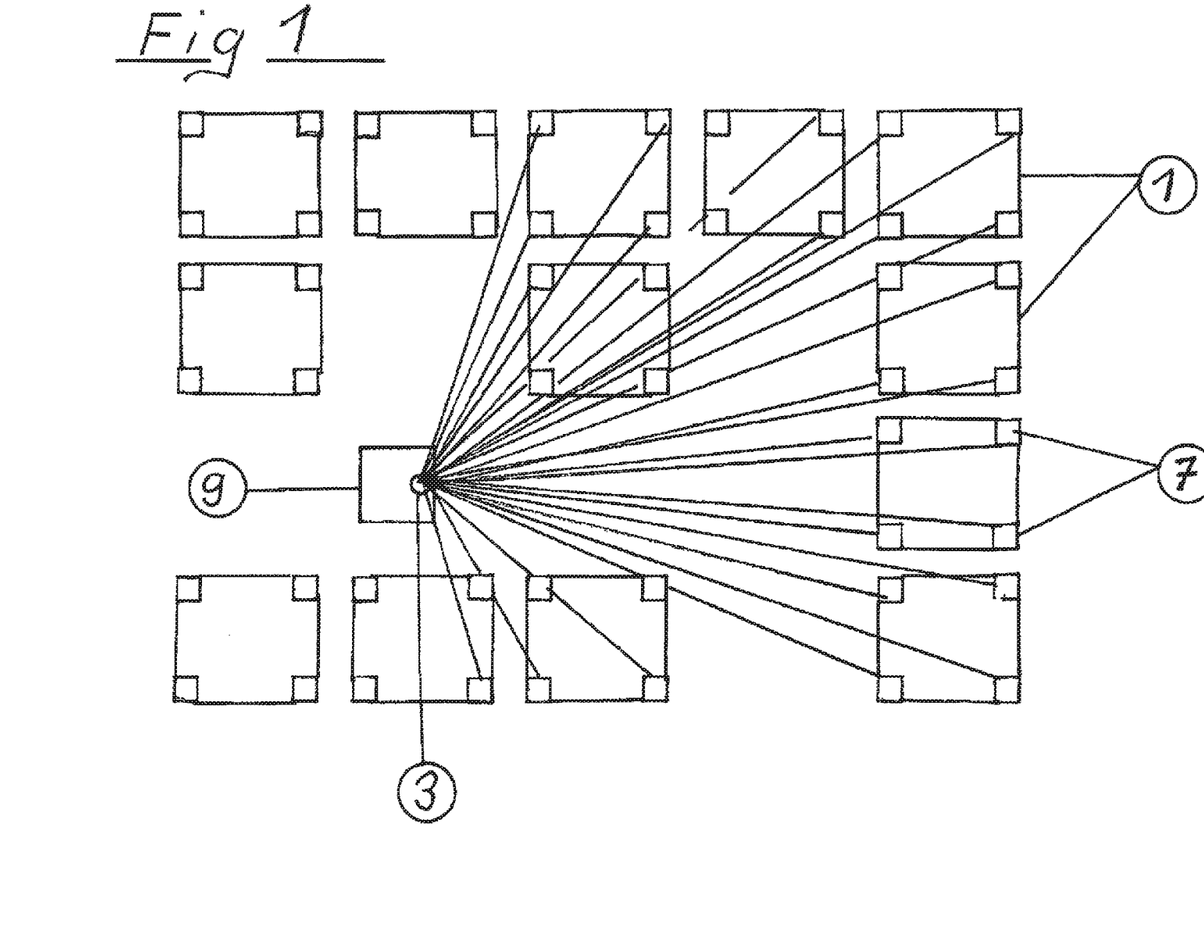
FIG. 1 shows an assembly of storage shelves to be transported.

FIG. 1 shows an assembly of storage shelves to be transported. In this illustration, a few storage shelves 1 which stand on in each case four shelf unit posts 7 are to be seen as a partial detail in the plan view, the exact position of said storage shelves being detected by means of a laser scanner 3 by a transport vehicle 9.

Figure 2:
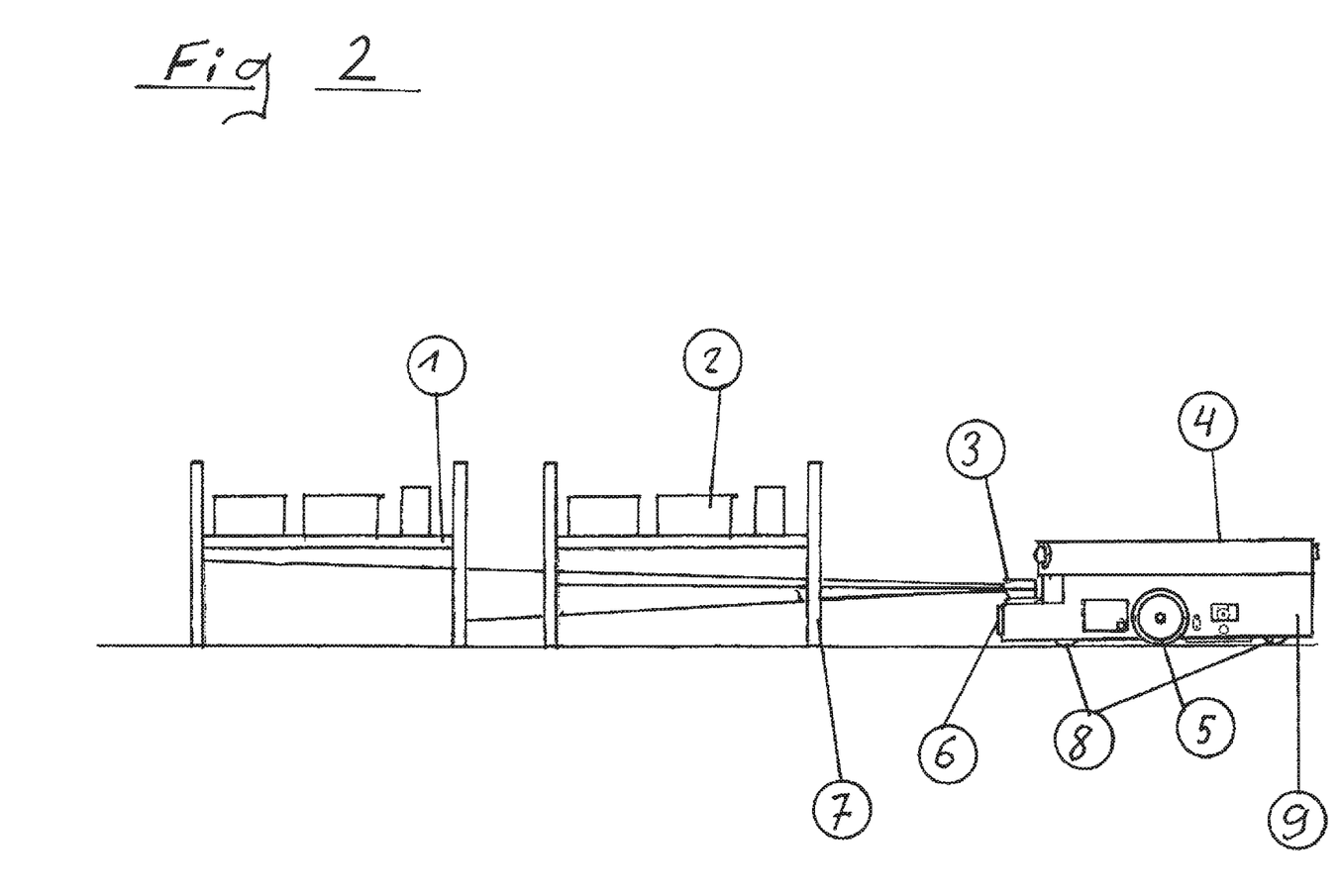
FIG. 2 shows a transport vehicle approaching storage shelves.

FIG. 2 shows a transport vehicle 9 approaching storage shelves 1. Two storage shelves 1 standing behind one another, having shelf unit posts 7 thereof and transported goods 2 thereof bearing thereon, are illustrated in the left region of FIG. 2. A transport vehicle 9 by means of two drive wheels 5 of which only one can be seen in the side view, and by means of a front and a rear support wheel 8 approaches these two storage shelves 1. In order for a storage shelf 1 to be received, the transport vehicle 9 has a height-adjustable support plate 4. In order for the environment of a transport vehicle 9 to be detected, each of these vehicles has a laser scanner 3 and a light-field sensor 6 at least on the front side.

In terms of the light-field sensor 6 used, reference is made to the new development of the so-called minilenses which in the form of hundreds of minilenses collect optical information according to the light-field principle, which information by data technology may then later be assembled to form images having a desired resolution and/or a desired viewing angle. Such minilenses are 3-D capable, cheap to manufacture, and are based on the principle of an insect eye. A more detailed description of the mechanism for progressive travel and for lifting a storage shelf 1 will be presented in the context of the description of FIG. 5.

Figure 3:
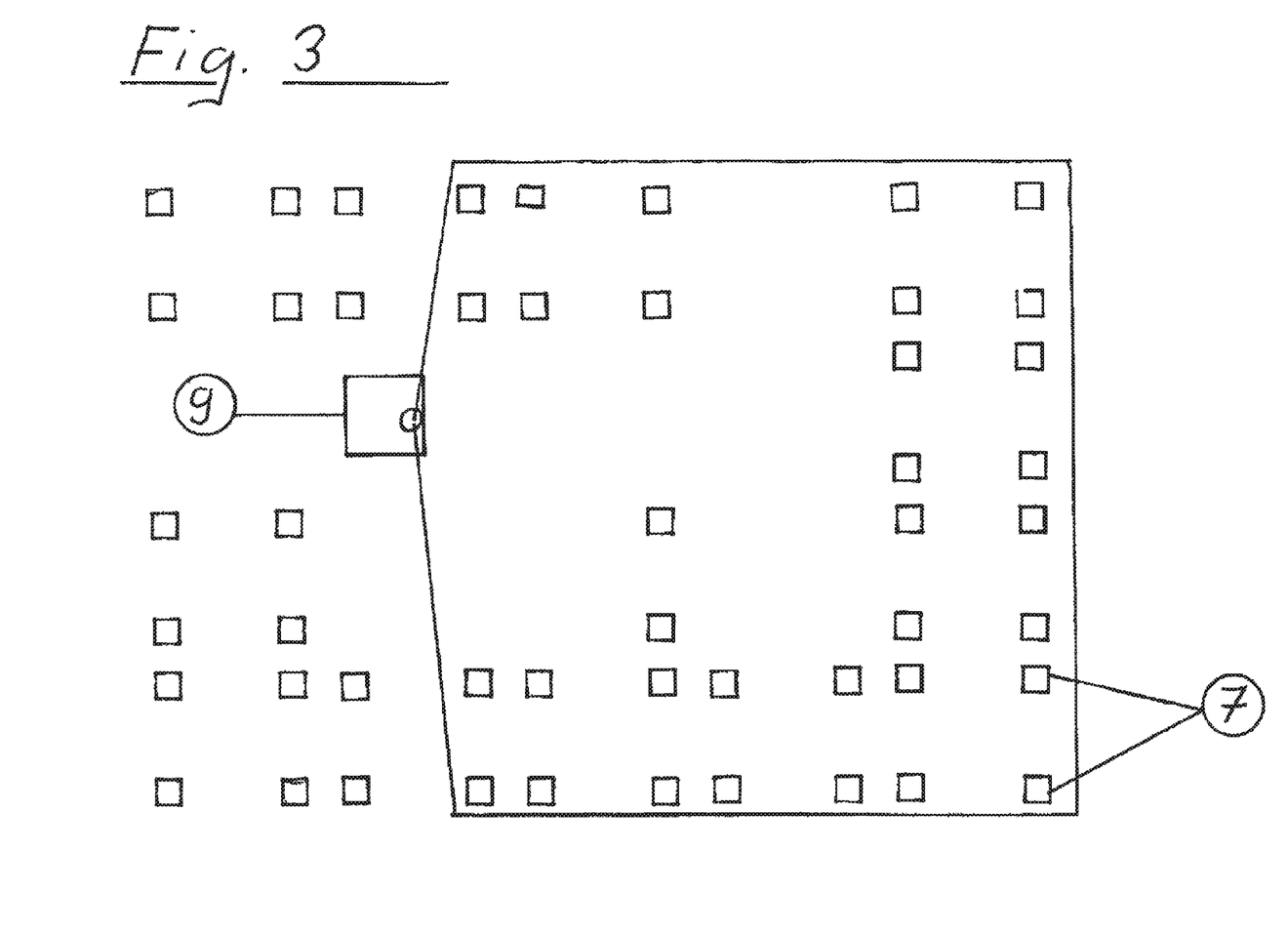
FIG. 3 shows an illustration of shelf unit posts as an orientation guide.

FIG. 3 shows an illustration of shelf unit posts as an orientation guide. The working world traveled by a transport vehicle 9 represents itself to the latter as a collection of shelf unit posts 7. Each shelf unit post 7 on each of the four sides thereof may have a marking in the form of a bar code or of a data-matrix code, which marking identifies said shelf unit post 7 as component part of a specific storage position and renders said shelf unit post 7 identifiable from all sides to a transport vehicle 9, mainly by means of the laser scanner of the latter.

Figure 4:
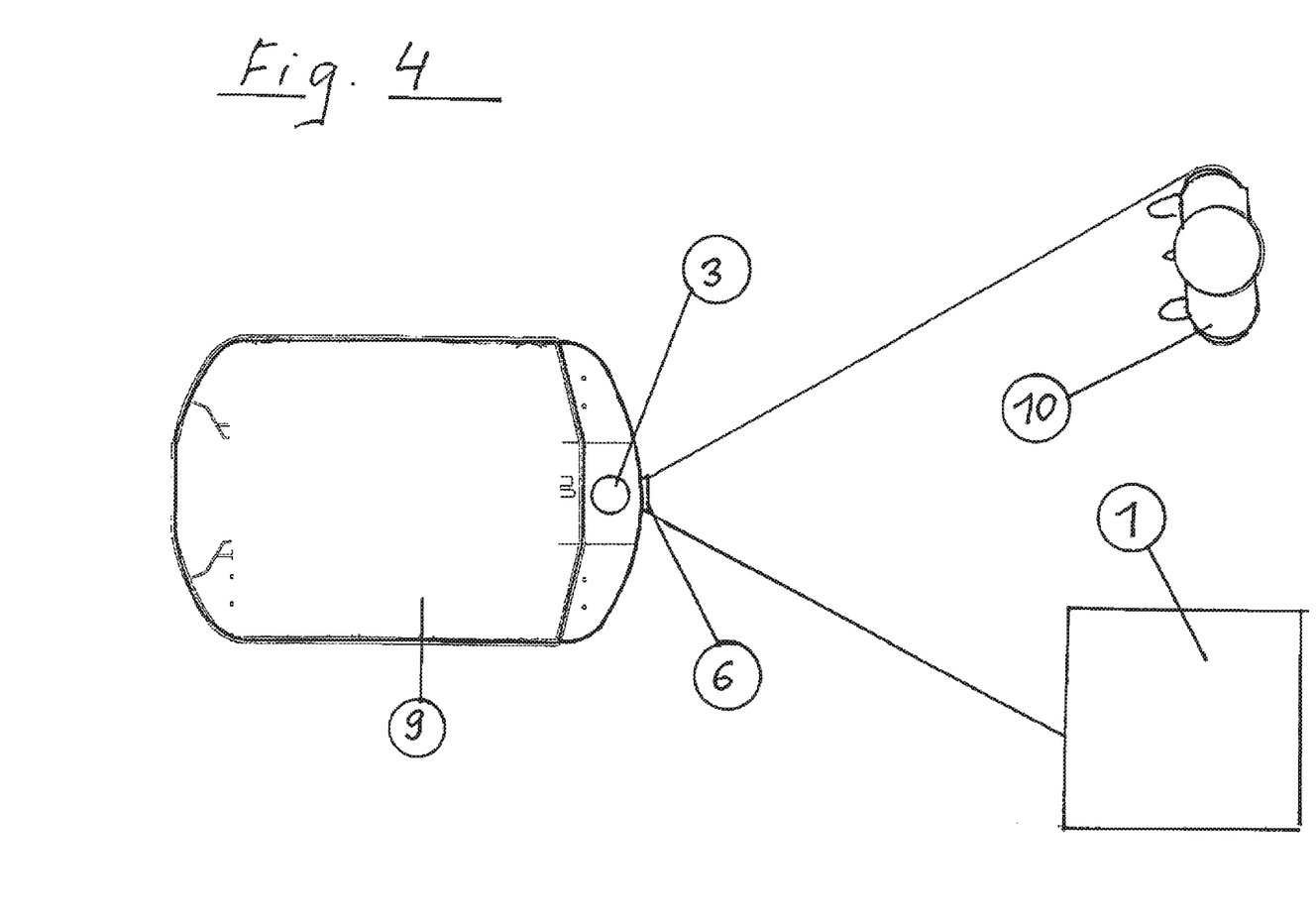
FIG. 4 shows an orientation situation of a transport vehicle.

FIG. 4 shows an orientation situation of a transport vehicle 9, having real obstacles.

This here is a normal storage shelf 1 which may be identified as has been previously described, on the one hand, and is a person 10 who does not really belong in this environment, on the other hand. Such a person 10, representing an unusual obstacle, is identified by a transport vehicle 9 by means of a light-field sensor.

Figure 5:
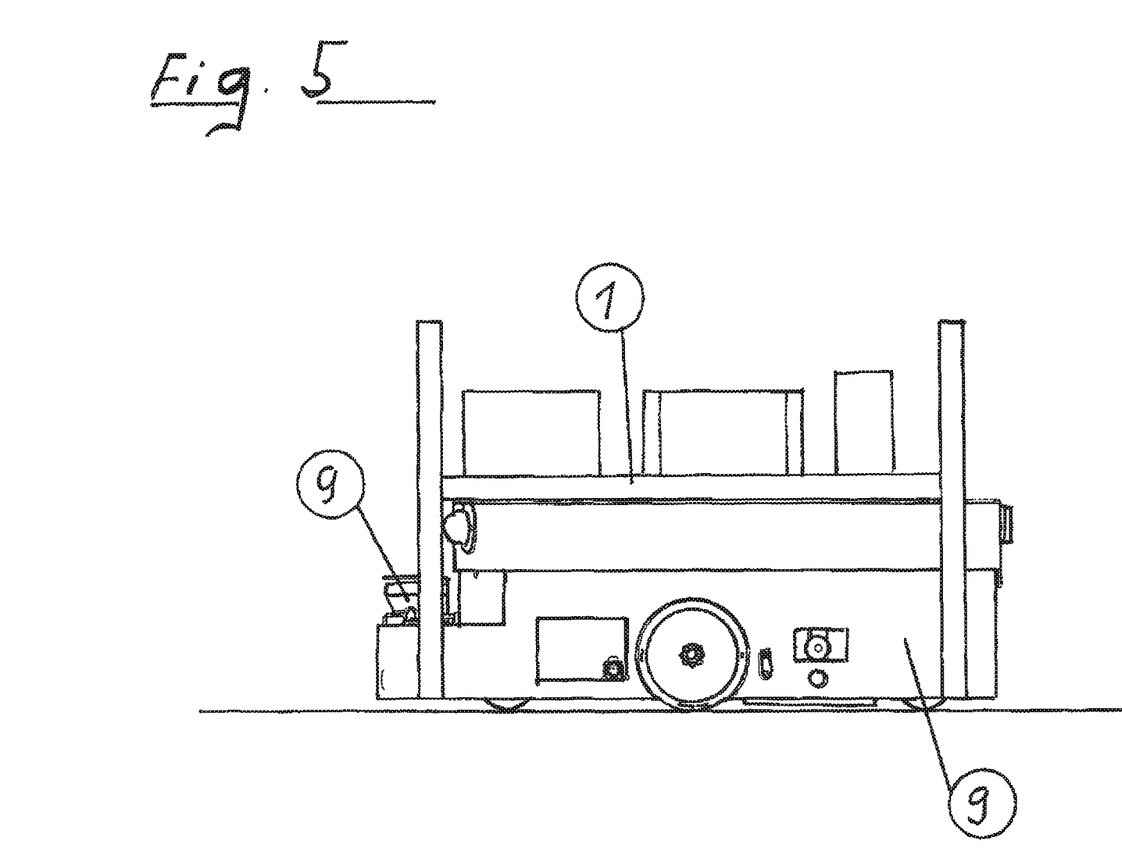
FIG. 5 shows a side view of a loaded transport vehicle.

FIG. 5 shows a side view of a loaded transport vehicle 9. The drive wheels and the support wheels of the latter touch the floor, and the storage shelf 1 bears on the support plate of the transport vehicle.

Figure 6:
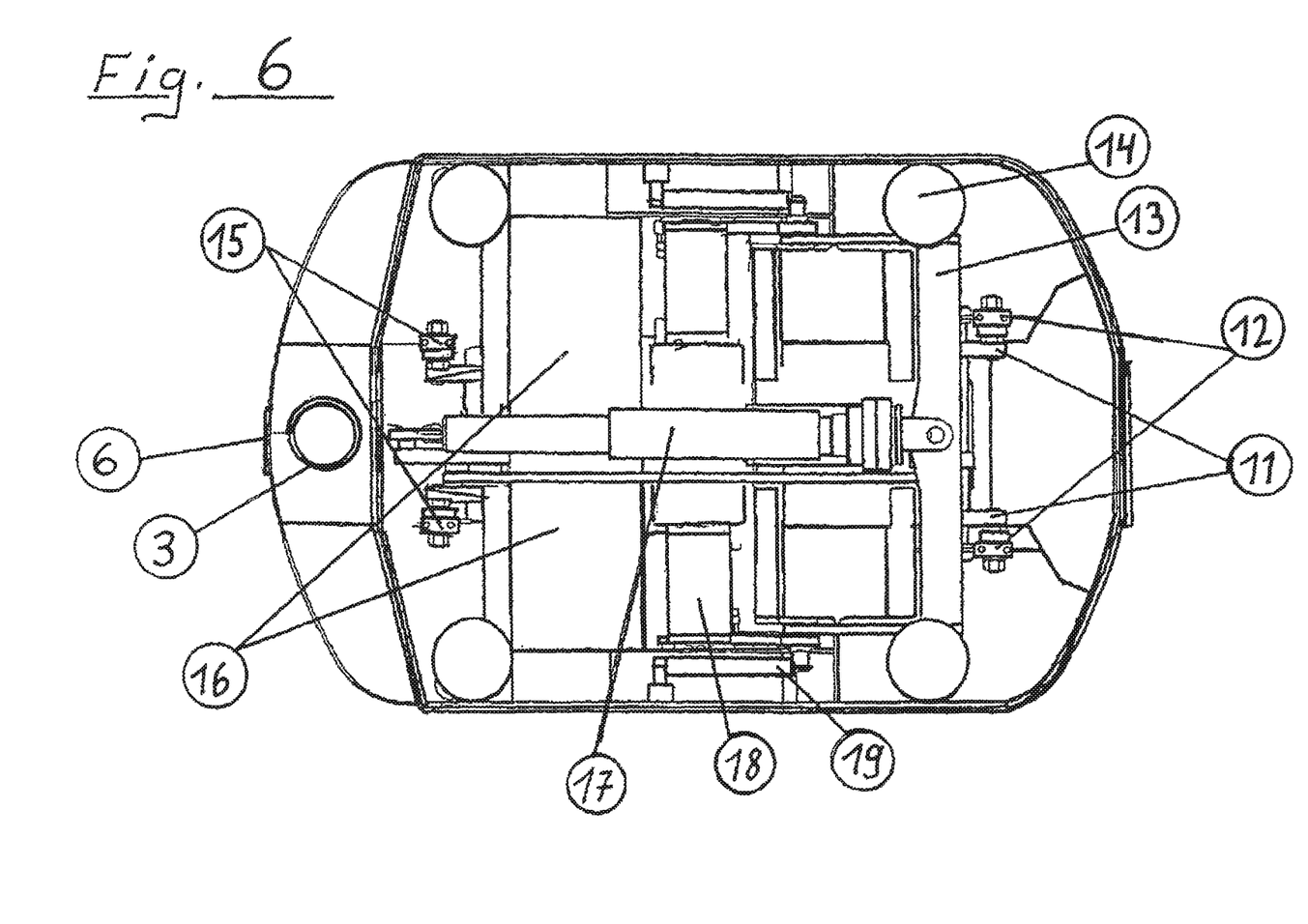
FIG. 6 shows a plan view of the kinematics of the transport vehicle.

FIG. 6 shows a plan view of the kinematics of the transport vehicle 9.

In this FIG. 6 a control member 17 can be seen in the longitudinal direction in a central position, which control member 17 in an extension of the longitudinal direction causes lifting of the four indicated and circular centering elements 14 by way of lifting elements (not visible in this illustration). The centering elements 14 fit into corresponding depressions of the support plate. The rear support plate suspension 12 and the front support plate suspension 15 can be seen as part of the mentioned lifting elements. The control member 17 is supported on a transverse link 13 which by way of lifting elements (not visible here) is connected to the two rear lifting-rod levers 11.

In this illustration, both servomotors for the two drive wheels can be seen from above, of which only the left servomotor is referenced with 18. The spring elements which guide both drive wheels, by way of deflection levers (not visible here) ensure that the drive wheels maintain secure floor contact even on a non-planar floor. Here too, only that spring element that in the driving direction is on the left side is referenced with 19. Referenced 16, in each case one left-side and one right-side installation space for energy storage units is illustrated. These here may be electric batteries or energy storage units for other liquid or gaseous forms of energy. A laser scanner 3 and a light-field sensor 6 are attached to the front side of the transport vehicle 9.

However, both types of sensors may also be additionally attached to both lateral faces and/or to the rear side of a transport vehicle.

Figure 7:
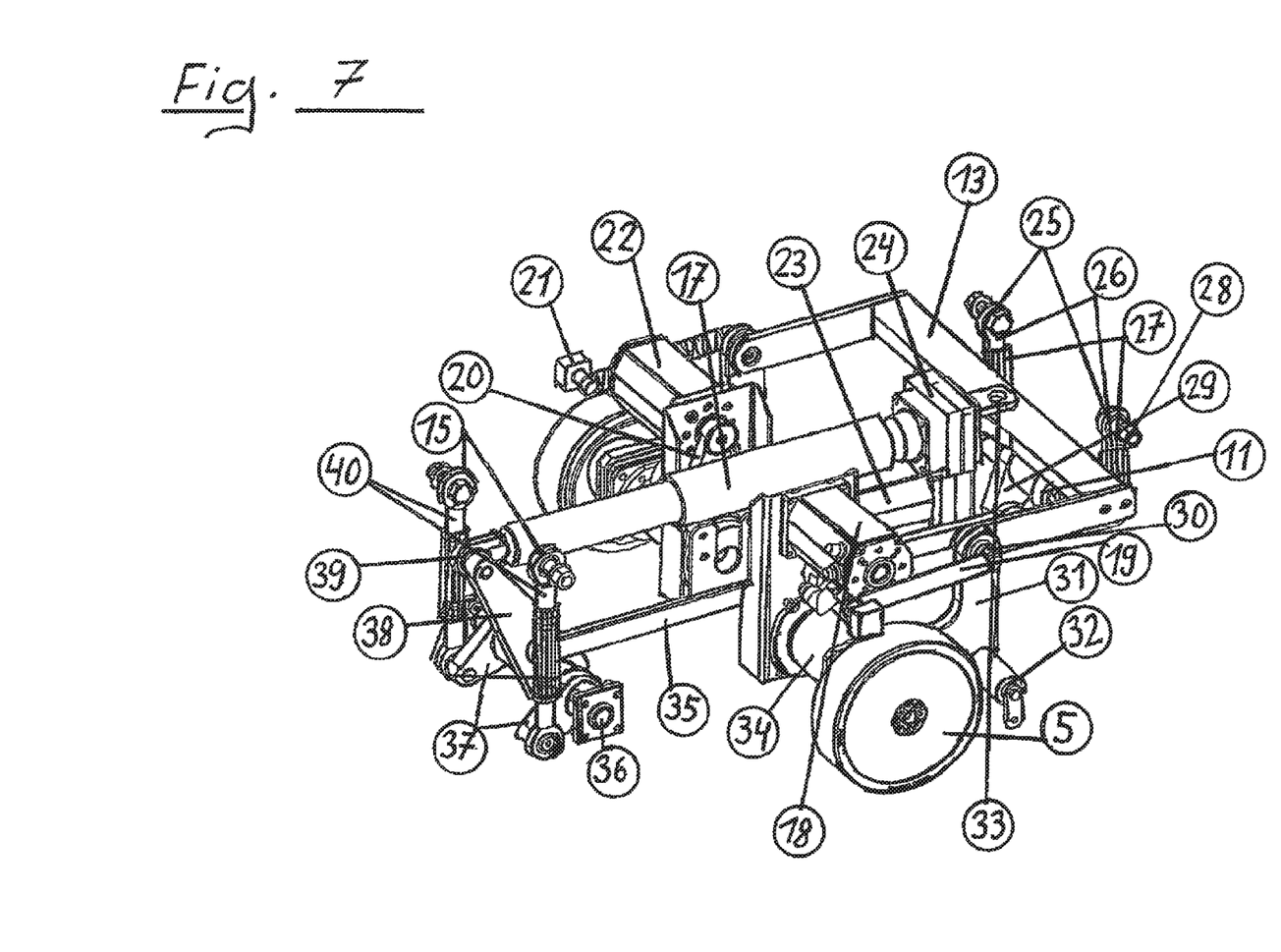
FIG. 7 shows a detailed illustration of the kinematics of the transport vehicle.

FIG. 7 shows a detailed illustration of the kinematics of the transport vehicle. This depiction illustrates the transport vehicle without the encasing housing. Reference to the connections to the housing will be made at a corresponding point. First, the kinematics of the drive wheels will be set forth.

The left-side drive wheel 5 known from FIG. 2 and the associated rotation axle 32, which is fastened to the housing of the transport vehicle (not referenced in more detail), can be seen in the foreground. The axle bearing 34 for the left-side drive wheel 5, having the servomotor 18 thereof serving as the drive for the drive wheel 5 and lying thereabove, are connected by way of an angular plate (not referenced in more detail and only visible from the rear) so as to form a functional unit. A gear belt by way of which the servomotor 18 drives the rotation axle of the left-side drive wheel 5 runs in this angular plate.

The corresponding servomotor 22 for the right-side drive can be seen on the opposite side. The corresponding angular plate on this side can be seen from the rear side in the illustration shown. The corresponding gear belt 20 running in this angular plate is identified here. The entire functional unit composed of the drive wheel 5 having the axle bearing 34, the servomotor 18, and the angular plate having the gear belt thereof, by way of an angular lever 31 is pivotable about the rotation axle 32 already mentioned above. By way of an articulation 30, the angular lever 31 is articulated on a U-shaped transverse link 13 which runs across almost the entire width of the transport vehicle and to the other end of which the right-side drive wheel is fastened in a corresponding manner. Furthermore, a spring element 19, the other mounting point of which is fastened to the housing of the transport vehicle, is mounted on the articulation 30. On the left side of the transport vehicle that is visible in FIG. 7, this articulation point is shown as a block-shaped mounting which is drawn so as to be hardly visible above the drive wheel 5.

By contrast, this point on the opposite side is referenced as the articulation point 21 of the corresponding right spring element. The spring element 19 serves the purpose of pushing the drive wheel 5 onto the floor area by way of the angular lever 31 and to thus improve contact of the drive wheel 5 with the floor. This applies in a corresponding manner to the right drive wheel lying opposite.

A further kinematics installation for lifting a storage shelf 1 will be set forth hereunder.

In order for a storage shelf 1 to be able to be picked up, it is necessary for the transport vehicle to lift the storage shelf 1 after having driven therebelow and to release floor contact of said storage shelf, so as to be able to transport the latter.

The front lifting rods 40 and the rear lifting rods 26 by way of direct contact serve this purpose.

The lifting rods 40 and 26 are lifted and lowered by means of a control member 17 which in turn generates the forces required therefor by means of a threaded spindle and by way of a retractable and deployable cylinder by way of a swivel head 39 and an articulated lift-and-rotate lever 38.

It can clearly be seen from the left side in FIG. 7 how the lift-and-rotate lever 38 in interaction with in each case one front lifting-rod lever 37 by means of corresponding rotation movements about a rotation axle 36, which is connected to the housing of the transport vehicle, causes the necessary lifting or lowering of the two front lifting rods 40.

The front lifting rods 40 support in each case the corresponding front support plate suspension.

At the same time, it can derived from this region of FIG. 7 that a push rod 35 which by way of an axle lever 29 transmits the movements of the lift-and-rotate lever 38 to in each case one rear push-rod lever 11 is articulated on the lift-and-rotate lever 38. The movements of the rear push-rod lever 11 lead to the necessary lifting or lowering of the two rear lifting rods 26. The rear lifting rods 26 in each case support the corresponding rear support plate suspension 25, a corresponding connection element to the housing being referenced with 28. The front support plate suspension is referenced with 15.

The movement of the control member 17 or of the threaded spindle thereof, respectively, is performed by way of a drive 23 and a power transmission 24 which diverts force. The power transmission 24 is fastened to the transverse link 13 by means of a fork head 33. Since the fork head is rotatably mounted on the transverse link 13, the transverse link 13 as a connection element between the angular levers 31 and the counterpart thereof lying opposite may move, enabling in this way that the two drive wheels may execute mutually independent vertical pivoting movements. The front lifting rods 40 and the rear lifting rods 26 in each case still have additional control members which, prior to the actual procedure of lifting the transported goods commences, lift the entire support plate out of a respective latching position which serves for securing the load during the driving mode. In an exemplary manner, the control members 27 are referenced for the rear lifting rods. Actuation of the mentioned control members may be performed separately and independently of the above described lifting of the transported goods.

Overall, on account of the demonstrated assembly of the lifting rods 40 and 26, the interdisposed lever assembly, and the control member 17 in interaction with the transverse link 13, and the action thereof on the angular lever 31 and the counterpart thereof, it is achieved that the center of gravity of the load of the storage shelf lies directly in the region of the drive wheels.

In order for the inclination of the transport vehicle and of the transported goods to be detected, a particular sensor is used, the latter however not being specifically referenced.

Since the transport vehicle enables transportation of transported goods across inclined planes, expensive elevator systems which in terms of control technology are complex may be dispensed with in many cases.

In one particular design embodiment it may be provided that the center of gravity of the storage shelf 1 is detected by means of sensors and the result of such center-of-gravity determination is used for controlling the control members of the lifting rods 40 and 26.

Furthermore, it may be provided in one particular design embodiment that sensors for detecting the rotation movement of the drive wheels 5 are provided, which sensors may also determine slippage on each drive wheel 5 dependent on the speed of the transport vehicle.

Furthermore, it may be provided that the inclination of a storage shelf 1 is determined by means of an inclination sensor.

A known method is preferably employed in order for the described transport vehicles to be controlled, said method having been developed by the Technical University of Berlin and having been published on Oct. 10, 2007 under:

Dynamic Routing of Automated Guided Vehicles in Real Time
(Ewgenij Gawrilow, Ekkehard Köhler, Rolf H. Möhring, Björn Stenzel)
[http://www.math.tuberlin.de/coga/publications/techreports/]

This here is substantially a two-part algorithm of which the first part comprises a preparation step and of which the second part computes a route in real time and here provides a specific time window for each section.

The application of the method described here related to an AGV network in the Altenwerder container terminal in the Port of Hamburg. However, the application of the same method for operating automated guided vehicles without interference in a warehouse does appear to be novel. Controlling the complex movement procedures and signal processing of the sensors used requires a special control program.

LIST OF REFERENCE SIGNS

1 Storage shelf
2 Transported goods
3 Laser scanner, 3-D scanner for collision prevention
4 Support plate, lifting plate
5 Drive wheel
6 Light-field sensor
7 Shelf unit post
8 Support wheel
9 Transport vehicle, vehicle body
10 Person
11 Rear lifting-rod lever
12 Rear support plate suspension
13 Transverse link
14 Centering element
15 Front support plate suspension
16 Installation space for energy storage unit
17 Control member, threaded spindle
18 Servomotor for left-side drive wheel
19 Spring element
20 Gear belt for right-side drive
21 Articulation point of right-side spring element on the housing
22 Servomotor for right-side drive
23 Drive for control member 17
24 Power transmission from the drive 23 to the control element 17
24 Rear support plate suspension having connection elements 17
25 Rear lifting rod
27 Control member for a rear lifting rod
28 Connection element for a rear support plate suspension 25
29 Axle lever
30 Articulation of an angular lever 31
31 Angular lever
32 Rotation axle
33 Fork head
34 Axle bearing for the left-side drive wheel
35 Push rod
36 Rotation axle for a lifting-rod lever 37
37 Front lifting-rod lever
38 Lift-and-rotate lever
39 Swivel head
40 Front lifting rod

The invention claimed is:

1. A transport vehicle for transporting storage shelves by partially autonomous operation and without interference in factory buildings, the transport vehicle comprising:

a) a vehicle body (9) having a support plate (4) adapted for receiving and transporting a storage shelf (1) having transported goods (2), having two separately driven drive wheels (5) on both sides of one in each case individually mounted rotation axle (32) in a center region of the vehicle body (9), b) wherein in each case at least one support wheel (8) is provided on a front side and on a rear side of the vehicle body (9), c) a transverse link (13) which connects the drive wheels (5) which are in each case by way of an angular lever (31) pivotable about the rotation axle (32) such that said drive wheels (5) are configured to execute mutually independent vertical movements, d) a centrally disposed control member (17), which by way of a lift-and-rotate lever (38) and by way of a push rod (35) connected to the lift-and-rotate lever (38), move two front lifting rods (40) by way of lifting rod levers (37) and two rear lifting rods (26) by way of lifting rods (11), for lifting or lowering the support plate (4), e) an installation space (16) for electric batteries or tanks for storing other energy sources is provided in the vehicle body (9), f) at least one laser scanner (3) and at least one light-field sensor (6) in a front region of the vehicle body (9), and g) a processor comprising a program for controlling the transport vehicle, wherein the processor is in communication with the at least one laser scanner (3) and the at least one light-field sensor (6).

2. The transport vehicle as claimed in claim 1, wherein at least one laser scanner (3) and at least one light-field sensor (6) are provided on each side of the transport vehicle.

3. The transport vehicle as claimed in claim 1, further comprising a first control member adapted for height adjustment of the two front lifting rods (40), and a second control member adapted for height adjustment of the two rear lifting rods (26).

4. The transport vehicle as claimed in claim 1, wherein the storage shelf (1) has a center of gravity and the transport vehicle includes a sensor adapted for detecting the center of gravity of the storage shelf (1).

5. The transport vehicle as claimed in claim 1, wherein sensors for detecting the rotation movement of the drive wheels (5) are provided, which sensors are adapted to determine slippage on each drive wheel (5) dependent on the speed of the transport vehicle.

6. A method for operating a transport vehicle for transporting storage shelves by partially autonomous operation and without interference in factory buildings, the method comprising:
   a) providing a warehouse comprising a command center adapted to receive an order for transportable goods, a storage shelf (1) having transportable goods (2), and a transport vehicle according to claim 1;
   b) receiving an order, wherein the order requests the transportable goods to be transported to a specific destination;
   c) sending the order to the transport vehicle, wherein the order identifies the storage shelf (1) having transportable goods (2) within the warehouse;
   d) instructing the transport vehicle to pick up the storage shelf (1), and to drive with the storage shelf (1) having the transported goods (2) located thereon to a specific storage space;
   e) instructing the transport vehicle to drive a specific route and speed to and from the storage shelf (1), wherein a laser scanner (3) and a light-field sensor (6) on the transport vehicle (9) identifies the storage shelf (1);
   f) instructing the transport vehicle (9) to drive the storage shelf (1) having the transportable goods (2) somewhere else in the warehouse.

7. The method as claimed in claim 6, wherein the storage shelf (1) has a center of gravity and the center of gravity of the storage shelf (1) is detected by sensors.

8. The method as claimed in claim 6, wherein the transport vehicle further comprises drive wheels (5) and sensors adapted for detecting the rotation movement of the drive wheels (5), wherein the sensors are adapted to also determine slippage on each drive wheel (5) dependent on the speed of the transport vehicle.

9. The method as claimed in claim 6, wherein the storage shelf (1) comprises shelf unit posts (7) and a marking in the form of a bar code or of a data-matrix code on all sides of the shelf unit posts (7).

10. A machine-readable carrier comprising a non-transitory program code of a computer program for carrying out a method for operating a transport vehicle for transporting storage shelves by partially autonomous operation and without interference in factory buildings, when the program is executed in a computer;
   the method comprising:
   a) providing a warehouse comprising a command center adapted to receive an order for transportable goods, a storage shelf (1) having transportable goods (2), and a transport vehicle;
   b) receiving an order, wherein the order requests the transportable goods to be transported to a specific destination;
   c) sending the order to the transport vehicle, wherein the order identifies the storage shelf (1) having transportable goods (2) within the warehouse;
   d) instructing the transport vehicle to pick up the storage shelf (1), and to drive with the storage shelf (1) having the transported goods (2) located thereon to a specific storage space;
   e) instructing the transport vehicle to drive a specific route and speed to and from the storage shelf (1), wherein a laser scanner (3) and a light-field sensor (6) on the transport vehicle (9) identifies the storage shelf (1);
   f) instructing the transport vehicle (9) to drive the storage shelf (1) having the transportable goods (2) somewhere else in the warehouse;
   wherein the transport vehicle comprises:
   a) a vehicle body (9) having a support plate (4) adapted for receiving and transporting a storage shelf (1) having transported goods (2), having two separately driven drive wheels (5) on both sides of one in each case individually mounted rotation axle (32) in a center region of the vehicle body (9),
   b) wherein in each case at least one support wheel (8) is provided on a front side and on a rear side of the vehicle body (9),
   c) a transverse link (13) which connects the drive wheels (5) which are in each case by way of an angular lever (31) pivotable about the rotation axle (32) such that said drive wheels (5) are configured to execute mutually independent vertical movements,
   d) a centrally disposed control member (17), which by way of a lift-and-rotate lever (38) and by way of a push rod (35) connected to the lift-and-rotate lever (38), move two front lifting rods (40) by way of lifting rod levers (37) and two rear lifting rods (26) by way of lifting rods (11), for lifting or lowering the support plate (4),
   e) an installation space (16) for electric batteries or tanks for storing other energy sources is provided in the vehicle body (9),
   f) at least one laser scanner (3) and at least one light-field sensor (6) in a front region of the vehicle body (9), and
   g) a processor comprising a program for controlling the transport vehicle, wherein the processor is in communication with the at least one laser scanner (3) and the at least one light-field sensor (6).

* * * * *